United States Patent [19]

Nagamoto et al.

[11] Patent Number: 4,575,479

[45] Date of Patent: Mar. 11, 1986

[54] DIAZO-TYPE THERMOSENSITIVE RECORDING MATERIAL WITH IMIDAZOLE COMPOUND

[75] Inventors: Masanaka Nagamoto, Shizuoka; Yoshihiro Suguro, Mishima, both of Japan

[73] Assignee: Ricoh Company, Ltd., Tokyo, Japan

[21] Appl. No.: 503,385

[22] Filed: Jun. 10, 1983

[30] Foreign Application Priority Data

Jun. 30, 1982 [JP] Japan ............................... 57-113415

[51] Int. Cl.[4] ......................... G03C 1/60; G03C 1/58; G01D 15/10

[52] U.S. Cl. .................................... 430/159; 430/151; 430/162; 430/176; 430/177; 430/346; 346/76 PH; 346/135.1; 346/218

[58] Field of Search ............... 430/176, 177, 159, 162, 430/151, 346; 346/76 PH, 135.1, 218

[56] References Cited

U.S. PATENT DOCUMENTS

| | | | |
|---|---|---|---|
| 3,754,916 | 8/1973 | Winslow et al. | 430/151 |
| 4,168,171 | 9/1979 | Winslow et al. | 430/151 |
| 4,230,789 | 10/1980 | Fish | 430/151 |
| 4,387,150 | 6/1983 | Yabuta et al. | 430/151 |
| 4,400,456 | 8/1983 | Matsuda et al. | 430/151 |
| 4,411,979 | 10/1983 | Nagamoto et al. | 430/151 |
| 4,487,826 | 12/1984 | Watanabe et al. | 430/151 |

*Primary Examiner*—Charles L. Bowers, Jr.
*Attorney, Agent, or Firm*—Flynn, Thiel, Boutell & Tanis

[57] ABSTRACT

A diazo-type thermosensitive recording material comprising a support material, a thermosensitive coloring layer formed thereon, which thermosensitive coloring layer comprises a diazonium compound layer containing a diazonium compound, and a coupler layer containing a coupler, and of the diazonium compound layer and the coupler layer, at least the lower layer near the support material further containing a thermo-fusible material and a water-insoluble binder agent, and in any portions other than the diazonium compound layer of the thermosensitive recording material, an imidazole derivative of the following formula being contained:

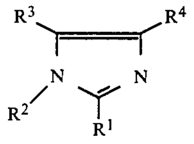

wherein $R^1$ represents a higher alkyl group, preferably with 6 to 24 carbon atoms, an alkoxyl or hydroxyalkyl group derived from the above higher alkyl group; $R^2$, $R^3$ and $R^4$ independently represent hydrogen, a phenyl group, a benzyl group, an alkyl group, an alkoxyl group, an hydroxyalkyl group or a cyanoalkyl group.

14 Claims, No Drawings

DIAZO-TYPE THERMOSENSITIVE RECORDING MATERIAL WITH IMIDAZOLE COMPOUND

BACKGROUND OF THE INVENTION

The present invention relates to a thermosensitive recording material, in particular, to a thermosensitive recording material with photo-fixing ability. More precisely, the present invention relates to a diazo-type thermosensitive recording material which colors in response to recording by thermal heads at a certain temperature; which loses coloring ability in the non-recorded areas upon photo-irradiation; and which cannot thereafter be further colored even if heated again.

Thermosensitive recording materials are being used not only for copying material from books and documents, but also as output recording sheets for computers, facsimile apparatus and medical analytical instruments, as well as for thermosensitive-recording-type magnetic tickets and thermosensitive-recording-type labels. Because of the ease of automatic recording, thermosensitive recording materials can also be utilized for securities, merchandise coupons, entrance tickets, certificates, payment slips and the like. However, thermosensitive recording materials for such uses must be image-fixable in order to maintain the integrity of the recorded information.

Conventionally, as an image-fixable thermosensitive recording material, a diazo-type thermosensitive recording material is known, which utilizes the coloring reaction between a diazonium compound and a coupler. In a conventional diazo photosensitive paper, the coloring reaction can be caused to occur, so as to provide sufficiently high image density by use of ammonium water or an alkaline solution as a developer, or by heat application, so long as it is used in a conventional manner with a conventional slow development speed. However, when it is necessary to cause the coloring reaction to occur much more quickly with a thermal head or thermal pen, this conventional diazo-type thermosensitive recording material cannot be used in practice because of its slow thermal response to a thermal head and poor preservability.

Especially in the field of facsimiles, a thermosensitive-recording material with rapid recording (rapid coloring) is required in order to minimize communication costs. Yet, again, this conventional diazo-type material does not satisfactorily meet such a requirement.

SUMMARY OF THE INVENTION

It is therefore an object of the present invention to provide a diazo-type thermosensitive recording material which is improved with respect to thermal response and preservability and is capable of providing high image density at high speed with minimum energy consumption.

According to the present invention, this object of the present invention is attained by a diazo-type thermosensitive recording material comprising a support material, a thermosensitive coloring layer formed thereon, which thermosensitive coloring layer comprises a diazonium compound layer containing as the main component a diazonium compound, and a coupler layer containing as the main component a coupler, in which diazo-type thermosensitive recording material, the diazonium compound layer and the coupler layer can be formed in any order, and, of the diazonium compound layer and the coupler layer, at least the lower layer near the support material further contains a thermo-fusible material and a water-insoluble binder agent, and in any portions other than the diazonium compound layer of the thermosensitive recording material, an imidazole derivative of the following formula is contained:

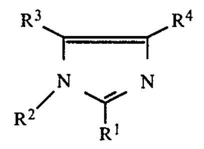

wherein $R^1$ represents a higher alkyl group, preferably with 6 to 24 carbon atoms, an alkoxy or hydroxyalkyl group derived from the above higher alkyl group; $R^2$, $R^3$ and $R^4$ independently represent hydrogen, a phenyl group, a benzyl group, an alkyl group, an alkoxy group, a hydroxyalkyl group or a cyanoalkyl group, the alkyl group, the alkoxy group, the hydroxyalkyl group and the cyanoalkyl group preferably having 1 to 24 carbon atoms.

DETAILED DESCRIPTION OF THE PREFERRED EMBODIMENTS

A diazo-type thermosensitive recording material according to the present invention comprises a support material, a thermosensitive coloring layer formed thereon, which thermosensitive coloring layer comprises a diazonium compound layer containing as the main component a diazonium compound, and a coupler layer containing as the main component a coupler, in which diazo-type thermosensitive recording material, the diazonium compound layer and the coupler layer can be formed in any order. In the present invention, when necessary, the thermosensitive coloring layer further comprises an undercoat layer which is formed immediately above the support material, an overcoat layer which is formed on the top layer of the recording material or an intermediate layer which is formed between the diazonium compound layer and the coupler layer. Of the diazonium compound layer and the coupler layer, at least the lower layer near the support material further contains a thermo-fusible material and a water-insoluble binder agent, and in any portions other than the diazonium compound layer of the thermosensitive recording material, an imidazole derivative of the following formula is contained:

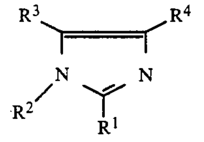

wherein $R^1$ represents a higher alkyl group, preferably with 6 to 24 carbon atoms, an alkoxy or hydroxyalkyl group derived from such a higher alkyl group; $R^2$, $R^3$ and $R^4$ independently represent hydrogen, a phenyl group, a benzyl group, an alkyl group, an alkoxy group, a hydroxyalkyl group or a cyanoalkyl group, the alkyl group, the alkoxy group, the hydroxyalkyl group and the cyanoalkyl group preferably having 1 to 24 carbon atoms.

In the above imidazole derivative, when the number of carbon atoms in the substituent $R^1$ is less than 6, such imidazole derivative is soluble in water, and due to the water-solubility, fogging is apt to occur in a diazo-type thermosensitive recording material containing such imidazole derivative, during storage thereof.

Further, the imidazole derivatives of the above formula, but having less than 6 carbon atoms in the substituent $R^1$, are apt to be sublimed, and due to the sublimation properties thereof, the diazo-type thermosensitive recording material containing such an imidazole derivative cannot be preserved for a long period of time, and images with high density cannot be obtained by thermal printing.

When the number of carbon atoms exceeds 24 in the substituent $R^1$, the melting point of the imidazole derivative is so high that high thermal sensitivity and high image density cannot be obtained.

As the imidazole derivative of the above formula, for example, the following can be employed: 2-undecylimidazole, 2-heptadecylimidazole, 2-undecyl-4-methylimidazole, 1-cyanoethyl-2-undecylimidazole, 1-cyanoethyl-2-heptadecyl-4-methylimidazole, and 1-benzyl-2-heptadecyl-4-methylimidazole.

In the present invention, the diazonium compound layer and the coupler layer can be formed in any order. At least in the lower layer of the diazonium compound layer and the coupler layer, there are contained a thermo-fusible material and a water-insoluble binder. Further, in the present invention, the above-described imidazole derivative is contained in any portion other than the diazonium compound layer of the thermosensitive recording material, for example, in the coupler layer, in the support material, in the undercoat layer immediately above the support material, in the overcoat layer on the top layer of the recording material or in the intermediate layer between the diazonium compound layer and the coupler layer.

When the imidazole derivative is contained in the diazonium compound layer, the preservability of the recording material is significantly decreased. Therefore, it is not preferable to contain the imidazole derivative in the diazonium compound layer.

It is preferable that the imidazole derivative employed in the recording material be in the range of 0.5 to 10 parts by weight with respect to one part of the diazonium compound, more preferably in the range of 1 to 10 parts by weight with respect to one part of the diazonium compound.

The thermo-fusible material can be contained either in the diazonium compound layer or in the coupler layer, or in both layers. Alternatively, the thermo-fusible material can be layered in the form of an independent layer.

According to the present invention, conventional diazonium compounds and couplers for use in conventional diazo-type recording materials can be employed.

Examples of such diazonium compounds are those represented by the following general formulae:

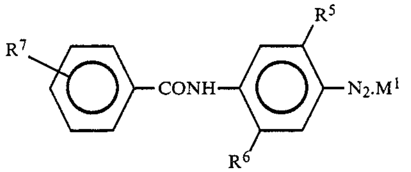

(I)

-continued

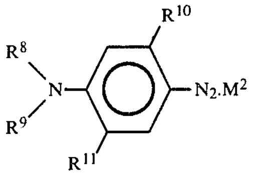

(II)

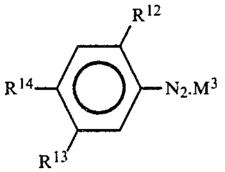

(III)

In the general formulae (I), (II) and (III), $R^5$, $R^{10}$ and $R^{12}$ each represent hydrogen, a halogen, an alkyl group or alkoxy group having one to five carbon atoms,

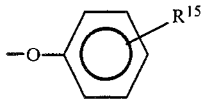 or 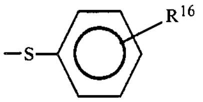

where $R^{15}$ and $R^{16}$ are the same as $R^6$;

$R^6$, $R^7$ and $R^{13}$ each represent hydrogen, a halogen or an alkyl or alkoxy group having one to five carbon atoms;

$R^8$ and $R^9$ each represent an identical or different alkyl group or hydroxyalkyl group with one to five carbon atoms or

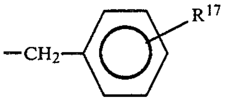

where $R^{17}$ is hydrogen, an alkyl or alkoxy group having one to three carbon atoms or a halogen;

$R^{11}$ represents hydrogen, a halogen, a trifluoromethyl group, an alkyl or alkoxy group having one to five carbon atoms or

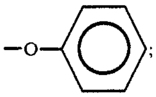;

$R^{14}$ represents

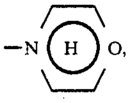, 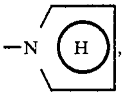, 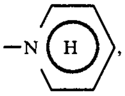,

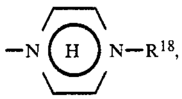,

-continued

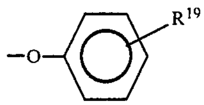

or

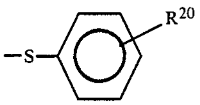

where $R^{18}$, $R^{19}$ and $R^{20}$ are the same as $R^{17}$;

$M^1$, $M^2$ and $M^3$ each represent an acidic residue or an acidic residue in the form of a double salt in combination with a metallic salt. As the acidic residue just mentioned, a halogen ion and an anion of fluorine-containing inorganic acids such as $BF_4$- or $PF_6$- are preferably used. As the metallic salt which forms a double salt in combination with the acidic residue, for example, $ZnCl_2$, $CdCl_2$ and $SnCl_2$ can be employed.

Specific examples of the diazonium compounds represented by the general formula (I) are as follows:

1

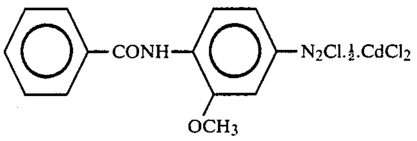

2

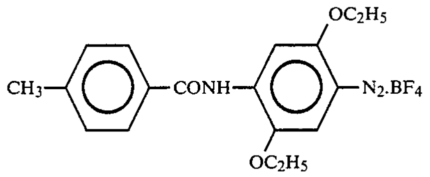

3

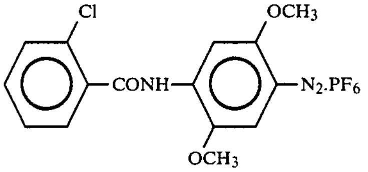

Specific examples of the diazonium compounds represented by the general formula (II) are as follows:

1

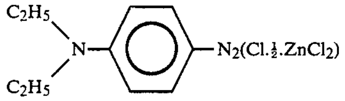

2

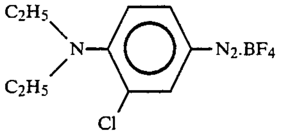

3

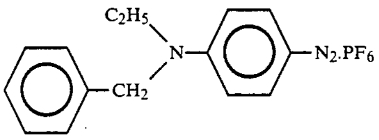

4

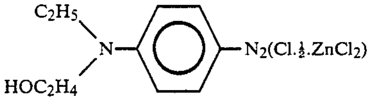

-continued

5

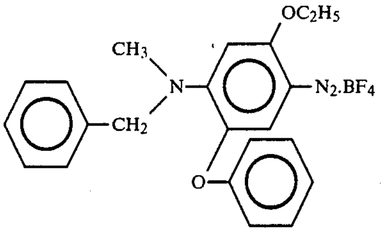

Specific examples of the diazonium compounds represented by the general formula (III) are as follows:

1

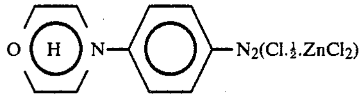

2

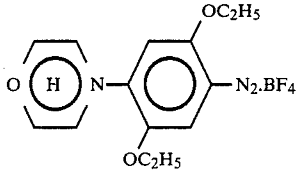

3

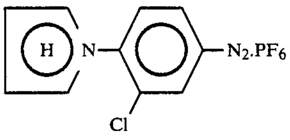

4

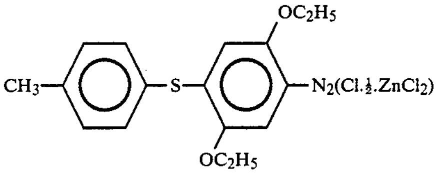

5

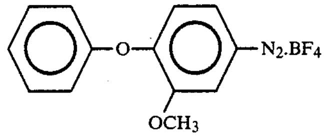

In the present invention, in order to obtain thermosensitive recording material with excellent preservability, it is preferable to employ the diazonium compounds in the form of water-insoluble salts, for example, the salts of fluorine-containing acids, for instance, $HBF_4$ or $HPF_6$.

Examples of the couplers for use in the present invention are as follows:

(1) Phenol derivatives such as phenol, resorcin, methyl-resorcin, 4,4-bis-resorcin, phloroglucinol, resorcylic acid, phloroglucinolcarboxylic acid, 2-methyl-5-methoxy-1,3-dihydroxybenzene, 5-methoxy-1,3-dihydroxybenzene, 4-N,N-dimethylphenol, 2,6-dimethyl-1,3,5-trihydroxybenzene, 2,6-dihydroxy-benzoic acid and 2,6-dihydroxy-3,5-dibromo-4-methoxy benzoic acid.

(2) Naphthol derivatives such as α-naphthol, β-naphthol, 4-methoxy-1-naphthol, 2,3-dihydroxynaphthalene, 2,3-dihydroxynaphthalene-6-sodium sulfonate, 2-hydroxy-3-propylmorpholino-naphthoic acid, 2-hydroxy-3-naphtho-o-toluidide, 2-hydroxy-3-naphthoic acid morpholinopropylamide, and Naphthol AS.

(3) Active methylene compounds such as acetanilide, 4-benzoylamino-2,5-diethoxyacetanilide, N-acetoacetooctadecylamine, N,N'-bis(acetoaceto)decane-1,10-diamine, and 2,4,6-tribromoacetanilide.

The couplers for use in the present invention are not limited to the above. Any other materials which serve as a coupler for the previously described diazonium compounds can be employed.

In the present invention, a thermo-fusible material is employed in order to attain high speed coloring of the recording material. Examples of the thermo-fusible material are as follows:

Alcohol derivatives such as 2-tribromoethanol, 2,2-dimethyl-trimethylene glycol and cyclohexane-1,2-diol; acid derivatives such as malonic acid, glutaric acid, maleic acid, and methylmaleic acid; animal waxes such as bees wax and shellac wax; plant waxes such as carnauba wax; mineral waxes such as montan wax; petroleum waxes such as paraffin wax and microcrystalline wax; and other synthetic waxes such as polyalcohol esters of higher fatty acids, higher fatty amines, higher fatty amides, condensates of fatty acids and amines, condensates of aromatic acids and amines, synthetic paraffins, paraffin chlorides, metal salts of high fatty acids, higher straight-chain glycols and dialkyl-3,4-epoxyhexahydrophthalate.

It is preferable that the thermo-fusible materials for use in the present invention have a melting or softening point ranging from 50° C. to 250° C. A thermo-fusible material with a melting or softening point below 50° C. would cause poor long-term preservation in the thermosensitive recording material, while a thermo-fusible material having a melting or softening point above 250° C. would lead to insufficient thermal response to a thermal head for practical use.

The thermo-fusible material, in the present invention, may be added in an amount of 2 to 30 parts by weight, preferably 5 to 10 parts by weight, to one part by weight of the diazonium compound in order to attain high speed coloring of the recording material. These amounts are particularly suitable in the case of high speed printing in facsimile apparatus or the like. If the amount of the thermo-fusible material is less than 2 parts by weight, high coloring efficiency cannot be obtained, while higher amounts than 30 parts by weight may lead to blurred images.

Furthermore, in the present invention, the thermosensitive coloring layer may contain auxiliary components such as acidic materials, basic materials, fillers and others if necessary.

Acidic materials are for preventing coupling reaction and for giving better preservability. The following are examples of acidic materials: Tartaric acid, citric acid, boric acid, lactic acid, gluconic acid and sulfuric acid.

Fillers are added for improving the compatibility of the thermosensitive coloring layer with the thermal head which applies heat to the layer for image formation. The following are examples of such fillers:

Organic and inorganic materials such as microparticles of styrene resin, microparticles of urea-formalin condensate resin, aluminum hydroxide, magnesium hydroxide, calcium carbonate, titanium, talc, kaoline, silica and aluminium.

The following auxiliary materials may also be used to adjust the coloring reaction: Zinc chloride, zinc sulfate, sodium citrate, guanidine sulfate, calcium gluconate, sorbitol and saccharose.

Furthermore, in the thermosensitive coloring layer of the recording material according to the present invention, a binder agent is employed. At least in the lower layer of the two layers, that is, the diazonium compound layer and the coupler layer of the recording material, the following water-insoluble binder agents can be employed to make the lower layer, the diazonium compound layer or the coupler layer, or both layers hydrophobic: Polyesters, polystyrene, chlorinated rubber, polyvinyl acetate, polyvinyl chloride, polybutadiene, polyacrylic acid ester, vinyl chloride/vinyl acetate copolymer, polybutadiene, styrene/butadiene/acryl copolymer, polyethylene, ethylene/vinyl acetate copolymer, styrene/acryl copolymer, polyvinylidiene chloride, vinylidiene chloride/acryl copolymer, phenol resin, urea/formalin resins and melamine resin. The above binder agents are organic-solvent-soluble or water-dispersible.

As the binder resins for use in the layers other than the lower layer, in addition to the above-described organic-solvent-soluble or water-dispersible resins, the following water-soluble resins can be employed:

Polyvinyl alcohol, polyacrylamide, casein, gelatin, starch and its derivatives, polyvinyl pyrrolidone, carboxymethyl cellulose, methyl cellulose, ethyl cellulose, chlorinated rubber, styrene/maleic anhydride copolymer, and iso(or di-iso)butylene/maleic anhydride copolymer.

As the support material for use in the present invention, paper, synthetic paper, plastic film or resin- or filler-coated base paper can be employed.

Embodiments of a diazo-type thermosensitive recording material according to the present invention will now be explained in detail by referring to the following examples:

EXAMPLE 1

(1) Preparation of Diazo Thermosensitive Coloring Layer Formation Liquid D-1

| | Parts by Weight |
|---|---|
| 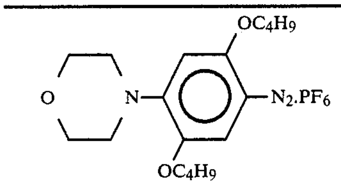 | 2 |
| N—cyclohexyl stearamide | 10 |
| Vinylidene chloride/acryl copolymer | 20 |
| Methyl ethyl ketone | 68 |

The above components were mixed and ground in a ball mill for 24 hours, whereby a diazo thermosensitive coloring layer formation liquid D-1 was prepared.

(2) Preparation of Coupler Layer Formation Liquid C-1

| | Parts by Weight |
|---|---|
| 2,3-dihydroxynaphthalene-6-sodium sulfonate | 5 |
| Urea-formalin condensate resin filler | 15 |
| 2-heptadecylimidazole | 5 |

-continued

| | Parts by Weight |
|---|---|
| Ammonium salt of diisobutylene-maleic anhydride copolymer | 10 |
| Water | 65 |

The above components were mixed and ground in a ball mill for 24 hours, whereby a coupler layer formation liquid C-1 was prepared.

An aqueous solution of polyvinyl alcohol solution was applied to the surface of high quality paper (ca. 50 $g/m^2$) so as to form an undercoat layer thereon with a deposition of about 2.0 $g/m^2$ of the solid component when dried.

After drying the undercoat layer, the above prepared diazo thermosensitive coloring layer formation liquid D-1 was applied to the undercoat-layer-coated paper to form a diazonium compound layer with a deposition of 2.5 $g/m^2$ of the solid components of the liquid D-1 when dried.

After drying the diazonium compound layer, the above prepared coupler layer formation liquid C-1 was applied to the diazonium compound layer to form a coupler layer on the diazonium compound layer with a deposition of 2.5 $g/m^2$ of the solid components of the liquid C-1 when dried, whereby a thermosensitive coloring layer was formed on the high quality paper.

The thus prepared thermosensitive recording material was subjected to drying and calendering so as to have a smoothness of 500 seconds in terms of Bekk's smoothness, whereby an embodiment No. 1 of a diazo-type thermosensitive recording material according to the present invention was prepared.

EXAMPLE 2

(1) Preparation of Diazo Thermosensitive Coloring Layer Formation Liquid D-2

| | Parts by Weight |
|---|---|
| 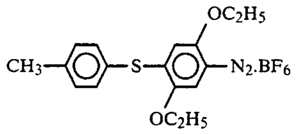 | 2 |
| N—stearylbenzamide | 15 |
| Vinyl chloride/vinyl acetate copolymer | 20 |
| Methyl cellosolve | 63 |

The above components were mixed and ground in a ball mill for 24 hours, whereby a diazo thermosensitive coloring layer formation liquid D-2 was prepared.

(2) Preparation of Coupler Layer Formation Liquid C-2

| | Parts by Weight |
|---|---|
| Naphthol AS | 5 |
| 4-benzoylamino-2,5-diethoxy-acetoacetanilide | 5 |
| Calcium carbonate | 10 |
| 2-heptadecylimidazole | 5 |
| Methyl cellulose | 5 |
| Water | 70 |

The above components were mixed and ground in a ball mill for 24 hours, whereby a coupler layer formation liquid C-2 was prepared.

An aqueous solution of polyvinyl alcohol solution was applied to the surface of high quality paper (ca. 50 $g/m^2$) in the same manner as in Example 1, so that an undercoat layer was formed thereon with a deposition of about 2.0 $g/m^2$ of the solid component when dried.

After drying the undercoat layer, the above prepared diazo thermosensitive coloring layer formation liquid D-2 was applied to the undercoat-layer-coated paper to form a diazonium compound layer with a deposition of 2.5 $g/m^2$ of the solid components of the liquid D-2 when dried.

After drying the diazonium compound layer, the above prepared coupler layer formation liquid C-2 was applied to the diazonium compound layer to form a coupler layer on the diazonium compound layer with a deposition of 2.5 $g/m^2$ of the solid components of the liquid C-2 when dried, whereby a thermosensitive coloring layer was formed on the high quality paper.

The thus prepared thermosensitive recording material was subjected to drying and calendering in the same manner as in Example 1 so as to have a smoothness of 500 seconds in terms of Bekk's smoothness, whereby an embodiment No. 2 of a diazo-type thermosensitive recording material according to the present invention was prepared.

EXAMPLE 3

(1) Preparation of Diazo Thermosensitive Coloring Layer Formation Liquid D-3

| | Parts by Weight |
|---|---|
| 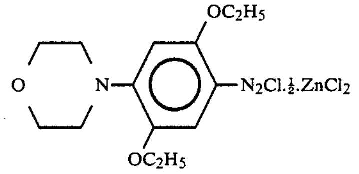 | 2 |
| Silica (Syloid 244 made by Dow Corning Corp.) | 10 |
| Polyvinyl alcohol | 5 |
| Water | 83 |

The above components were mixed and ground in a ball mill for 24 hours, whereby a diazo thermosensitive coloring layer formation liquid D-3 was prepared.

(2) Preparation of Coupler Layer Formation Liquid C-3

| | Parts by Weight |
|---|---|
| Naphthol AS | 5 |
| 2-undecylimidazole | 5 |
| Stearamide | 20 |
| Styrene/acryl copolymer | 20 |
| Water | 50 |

The above components were mixed and ground in a ball mill for 24 hours, whereby a coupler layer formation liquid C-3 was prepared.

An aqueous solution of polyvinyl alcohol solution was applied to the surface of high quality paper (ca. 50 $g/m^2$) in the same manner as in Example 1, so that an undercoat layer was formed thereon with a deposition of about 2.0 $g/m^2$ of the solid component when dried.

After drying the undercoat layer, the above prepared coupler layer formation liquid C-3 was applied to the undercoat-layer-coated paper to form a coupler layer thereon with a deposition of 2.5 $g/m^2$ of the solid components of the liquid C-3 when dried.

After drying the coupler layer, the above prepared diazonium compound layer formation liquid D-3 was applied to the coupler layer to form a diazonium compound layer thereon with a deposition of 2.5 $g/m^2$ of the solid components of the liquid D-3 when dried, whereby a thermosensitive coloring layer was formed on the high quality paper.

The thus prepared thermosensitive recording material was subjected to drying and calendering in the same manner as in Example 1 so as to have a smoothness of 500 seconds in terms of Bekk's smoothness, whereby an embodiment No. 3 of a diazo-type thermosensitive recording material according to the present invention was prepared.

COMPARATIVE EXAMPLE 1

Preparation of Comparative Coupler Layer Formation Liquid CC-1

| | Parts by Weight |
|---|---|
| 2,3-dihydroxynaphthalene-6-sodium sulfonate | 5 |
| Urea-formalin condensate resin filler | 15 |
| Ammonium salt of diisobutylene-maleic anhydride copolymer | 10 |
| Water | 65 |

The above components were mixed and ground in a ball mill for 24 hours, whereby a comparative coupler layer formation liquid CC-1 was prepared. This comparative coupler layer formation liquid CC-1 corresponds to a liquid prepared by eliminating 2-heptadecylimidazole from the coupler layer formation liquid C-1 employed in Example 1.

To the surface of the same support material with the same undercoat layer as that employed in Example 1, there was applied the diazo thermosensitive coloring layer formation liquid D-1 which was employed in Example 1, with a deposition of of 2.5 $g/m^2$ of the solid components thereof when dried, in order to form a diazonium compound layer thereon.

After drying the diazonium compound layer, the above prepared comparative coupler layer formation liquid CC-1 was applied to the diazonium compound layer to form a coupler layer on the diazonium compound layer with a deposition of 2.5 $g/m^2$ of the solid components of the liquid CC-1 when dried, whereby a thermosensitive coloring layer was formed on the high quality paper.

The thus prepared thermosensitive recording material was subjected to drying and calendering in the same manner as in Example 1, whereby a comparative diazo-type thermosensitive recording material No. 1 was prepared.

COMPARATIVE EXAMPLE 2

Preparation of Comparative Coupler Layer Formation Liquid CC-2

| | Parts by Weight |
|---|---|
| Naphthol AS | 5 |
| 4-benzoylamino-2,5-diethoxy-acetoacetanilide | 5 |
| Calcium carbonate | 10 |
| Methyl cellulose | 5 |
| Water | 70 |

The above components were mixed and ground in a ball mill for 24 hours, whereby a comparative coupler layer formation liquid CC-2 was prepared. This comparative coupler layer formation liquid CC-2 corresponds to a liquid prepared by eliminating 2-heptadecylimidazole from the coupler layer formation liquid C-2 employed in Example 2.

To the surface of the same support material with the same undercoat layer as that employed in Example 2, there was applied the diazo thermosensitive coloring layer formation liquid D-2 which was employed in Example 2, with a deposition of of 2.5 $g/m^2$ of the solid components thereof when dried, in order to form a diazonium compound layer thereon.

After drying the diazonium compound layer, the above prepared comparative coupler layer formation liquid CC-2 was applied to the diazonium compound layer to form a coupler layer on the diazonium compound layer with a deposition of 2.5 $g/m^2$ of the solid components of the liquid CC-2 when dried, whereby a thermosensitive coloring layer was formed on the high quality paper.

The thus prepared thermosensitive recording material was subjected to drying and calendering in the same manner as in Example 1, whereby a comparative diazo-type thermosensitive recording material No. 2 was prepared.

COMPARATIVE EXAMPLE 3

Preparation of Comparative Coupler Layer Formation Liquid CC-3

| | Parts by Weight |
|---|---|
| Naphthol AS | 5 |
| Stearamide | 20 |
| Styrene/acryl copolymer | 20 |
| Water | 50 |

The above components were mixed and ground in a ball mill for 24 hours, whereby a comparative coupler layer formation liquid CC-3 was prepared. This comparative coupler layer formation liquid CC-3 corresponds to a liquid prepared by eliminating 2-undecylimidazole from the coupler layer formation liquid C-3 employed in Example 3.

To the surface of the same support material as that employed in Example 3, there was applied the above prepared comparative coupler layer formation liquid CC-3 with a deposition of 2.5 $g/m^2$ of the solid components of the liquid CC-3 when dried.

After drying the comparative coupler layer, the diazo thermosensitive coloring layer formation liquid D-3 which was employed in Example 3 was applied to the comparative coupler layer, with a deposition of of 2.5 g/m² of the solid components thereof when dried, in order to form a diazonium compound layer thereon.

After drying the diazonium compound layer, the thus prepared thermosensitive recording material was subjected to drying and calendering in the same manner as in Example 1, whereby a comparative diazo-type thermosensitive recording material No. 3 was prepared.

COMPARATIVE EXAMPLE 4

Example 1 was repeated except that the coupler layer formation liquid C-1 was replaced by a comparative coupler layer formation liquid CC-4 with the following formulation, whereby a comparative diazo-type thermosensitive recording material No. 4 was prepared.

| | Parts by Weight |
|---|---|
| 2,3-dihydroxynaphthalene-6-sodium sulfonate | 5 |
| Urea-formalin condensate resin filler | 15 |
| Imidazole | 5 |
| Ammonium salt of diisobutylene-maleic anhydride copolymer | 10 |
| Water | 65 |

The comparative coupler layer formation liquid CC-4 was prepared by mixing and grinding the above components in a ball mill for 24 hours. The liquid CC-4 corresponds to a liquid prepared by replacing 2-heptadecylimidazole in the liquid C-1 employed in Example 1 by imidazole.

COMPARATIVE EXAMPLE 5

Example 2 was repeated except that the coupler layer formation liquid C-2 was replaced by a comparative coupler layer formation liquid CC-5 with the following formulation, whereby a comparative diazo-type thermosensitive recording material No. 5 was prepared.

| | Parts by Weight |
|---|---|
| Naphthol AS | 5 |
| 4-benzoylamino-2,5-diethoxy-acetoacetanilide | 5 |
| Calcium carbonate | 10 |
| Diphenylguanidine | 5 |
| Methyl cellulose | 5 |
| Water | 70 |

The comparative coupler layer formation liquid CC-5 was prepared by mixing and grinding the above components in a ball mill for 24 hours. The liquid CC-5 corresponds to a liquid prepared by replacing 2-heptadecylimidazole in the liquid C-2 employed in Example 2 by diphenylguanidine.

COMPARATIVE EXAMPLE 6

Example 3 was repeated except that the coupler layer formation liquid C-3 was replaced by a comparative coupler layer formation liquid CC-6 with the following formulation, whereby a comparative diazo-type thermosensitive recording material No. 6 was prepared.

| | Parts by Weight |
|---|---|
| Naphthol AS | 5 |
| Benzimidazole | 5 |
| Stearamide | 20 |
| Styrene/acryl copolymer | 20 |
| Water | 50 |

The comparative coupler layer formation liquid CC-6 was prepared by mixing and grinding the above components in a ball mill for 24 hours. The liquid CC-6 corresponds to a liquid prepared by replacing 2-undecylimidazole in the liquid C-3 employed in Example 3 by benzimidazole.

COMPARATIVE EXAMPLE 7

Example 2 was repeated except that the diazo thermosensitive coloring layer formation liquid D-2 was replaced by a comparative diazo thermosensitive coloring layer formation liquid CD-2 with the following formulation:

| | Parts by Weight |
|---|---|
| 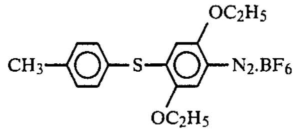 | 2 |
| Vinyl chloride/vinyl acetate copolymer | 20 |
| Methyl cellosolve | 63 |

The above components were mixed and ground in a ball mill for 24 hours, whereby the comparative diazo thermosensitive coloring layer formation liquid CD-2 was prepared. The liquid CD-2 corresponds to a liquid prepared by eliminating N-stearyl benzamide from the formulation of the liquid D-2 employed in Example 2.

Thus, a comparative diazo-type thermosensitive recording material No. 7 was prepared.

COMPARATIVE EXAMPLE 8

Example 2 was repeated except that the diazo thermosensitive coloring layer formation liquid D-2 was replaced by a comparative diazo thermosensitive coloring layer formation liquid CD-2′ with the following formulation, whereby a comparative diazo-type thermosensitive recording material No. 8 was prepared.

| | Parts by Weight |
|---|---|
| 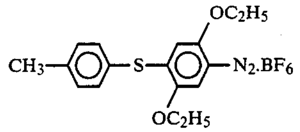 | 2 |
| N—stearylbenzamide | 15 |
| Methyl cellosolve | 63 |

The comparative diazo thermosensitive coloring layer formation liquid CD-2′ was prepared by mixing and grinding the above components in a ball mill for 24 hours. The liquid CD-2′ corresponds to a liquid prepared by eliminating the vinyl chloride vinyl acetate copolymer from the formulation of the liquid D-2 employed in Example 2.

COMPARATIVE EXAMPLE 9

Example 3 was repeated except that the coupler layer formation liquid C-3 was replaced by a comparative coupler layer formation liquid CC-7 with the following formulation, whereby a comparative diazo-type thermosensitive recording material No. 9 was prepared.

| | Parts by Weight |
|---|---|
| Naphthol AS | 5 |
| 2-undecylimidazole | 5 |
| Water | 50 |

The comparative coupler layer formation liquid CC-7 was prepared by mixing and grinding the above components in a ball mill for 24 hours. The liquid CC-7 corresponds to a liquid prepared by eliminating the stearamide and styrene/acryl copolymer from the formulation of the liquid C-3 employed in Example 3.

COMPARATIVE EXAMPLE 10

Example 3 was repeated except that the coupler layer formation liquid C-3 was replaced by a comparative coupler layer formation liquid CC-8 with the following formulation, whereby a comparative diazo-type thermosensitive recording material No. 10 was prepared.

| | Parts by Weight |
|---|---|
| Naphthol AS | 5 |
| 2-undecylimidazole | 5 |
| Stearamide | 20 |
| Polyacrylamide | 20 |
| Water | 50 |

The comparative coupler layer formation liquid CC-8 was prepared by mixing and grinding the above components in a ball mill for 24 hours. The liquid CC-8 corresponds to a liquid prepared by replacing the styrene/acryl copolymer in the liquid C-3 employed in Example 3 by polyacrylamide.

The following table 1 shows the structures of the diazo-type thermosensitive recording materials No. 1 through No. 3 according to the present invention and the comparative thermosensitive recording materials No. 1 through No. 10.

TABLE 1

| | Embodiments | | Comparative Example | |
|---|---|---|---|---|
| No. | 1st Layer | 2nd Layer | 1st Layer | 2nd Layer |
| 1 | D-1 | C-1 | D-1 | CC-1 |
| 2 | D-2 | C-2 | D-2 | CC-2 |
| 3 | C-3 | D-3 | CC-3 | D-3 |
| 4 | — | — | D-1 | CC-4 |
| 5 | — | — | D-2 | CC-5 |
| 6 | — | — | CC-6 | D-3 |
| 7 | — | — | CD-2 | C-2 |
| 8 | — | — | CD-2' | C-2 |
| 9 | — | — | CC-7 | D-3 |
| 10 | — | — | CC-8 | D-3 |

(In the above table, the 1st layer is the lowermost layer in contact with the support material.)

In the thermosensitive recording materials thus obtained, images were formed by a commercially available facsimile apparatus (Rifax 303 made by Ricoh Company, Ltd.) under G-II mode. The images were then fixed by complete exposure to light using a commercially available diazo copying machine (Ricopy High-Start made by Ricoh Company, Ltd.). After the image fixing, the background of each thermosensitive recording material was no longer colored by application of heat thereto and the fixed images did not disappear when they were brought into contact with ordinarily available organic solvents.

Each image density obtained was determined by a Macbeth densitometer (RD-514).

The initial background density of each thermosensitive recording material was then measured by the Macbeth densitometer (RD-514) immediately after complete exposure of each diazo recording material to light, followed by application of the coating liquids and drying the same.

The preservability of each diazo thermosensitive recording material was also measured by measuring the background density after exposure to light, followed by a forced test in which the material was kept at 40 C. for 24 hours under relative humidity of 90%, as measured by Macbeth densitometer (RD-514).

The results are summarized in Table 2.

TABLE 2

| | Item | | | | |
|---|---|---|---|---|---|
| | Develloped | Image Density | | Background Density | |
| Sample | Color | Initial Density | Preservability | Initial Density | Preservability |
| Example | | | | | |
| 1 | Blue | 1.21 | 1.20 | 0.08 | 0.19 |
| 2 | Black | 1.17 | 1.19 | 0.08 | 0.15 |
| 3 | Blue | 1.15 | 1.13 | 0.08 | 0.15 |
| Comparative Example | | | | | |
| 1 | Blue | 0.75 | 0.74 | 0.08 | 0.18 |
| 2 | Reddish Black | 0.68 | 0.66 | 0.07 | 0.16 |
| 3 | Blue | 0.63 | 0.65 | 0.08 | 0.14 |
| 4 | Blue | 1.23 | 0.78 | 0.15 | 0.47 |
| 5 | Black | 0.76 | 0.74 | 0.09 | 0.51 |
| 6 | Blue | 0.75 | 0.77 | 0.09 | 0.43 |
| 7 | Black | 0.72 | 0.71 | 0.07 | 0.13 |
| 8 | Black | 1.20 | 1.18 | 1.10 | 1.12 |
| 9 | Blue | 1.07 | 1.08 | 1.00 | 1.02 |
| 10 | Blue | 1.05 | 1.08 | 0.08 | 0.38 |

What is claimed is:

1. A diazo-type thermosensitive recording material comprising a support, a thermosensitive coloring layer formed on said support, said thermosensitive coloring layer comprising a diazonium compound layer containing a diazonium compound and a coupler layer containing a coupler, and, of said diazonium compound layer and said coupler layer, at least the layer thereof that is closer to said support also contains a thermo-fusible material and a water-insoluble binder agent, said thermo-fusible material being effective to obtain high speed coloring of said recording material when a thermal printing head is applied thereto, the amount of said thermo-fusible material being in the range of from 2 to 30 parts by weight per one part by weight of said diazonium compound, and a portion of said thermosensitive recording material, other than said diazonium compound layer, contains an imidazole derivative of the following formula:

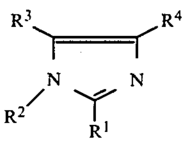

wherein $R^1$ is alkyl, alkoxy or hydroxyalkyl, all having from 11 to 24 carbon atoms; $R^2$, $R^3$ and $R^4$ independently represent hydrogen, phenyl, benzyl, alkyl, alkoxy, hydroxyalkyl or cyanoalkyl.

2. A diazo-type thermosensitive recording material as claimed in claim 1, wherein said alkyl, alkoxy, hydroxyalkyl and cyanoalkyl represented by $R^2$, $R^3$, or $R^4$ in said imidazole derivative each has 1 to 24 carbon atoms.

3. A diazo-type thermosensitive recording material as claimed in claim 1, wherein the amount of said imidazole derivative is in the range of 0.5 part by weight to 10 parts by weight with respect to one part by weight of said diazonium compound.

4. A diazo-type thermosensitive recording material as claimed in claim 1, wherein the melting point or softening point of said thermo-fusible material is in the range of 50° C. to 250° C.

5. A diazo-type thermosensitive recording material as claimed in claim 1, wherein said thermo-fusible material is selected from the group consisting of alcohol derivatives, animal waxes, plant waxes, mineral waxes, petroleum waxes and synthetic waxes, each having a melting point or softening point in the range of 50° C. to 250° C.

6. A diazo-type thermosensitive recording material as claimed in claim 1, wherein the amount of said thermo-fusible material is in the range of 5 parts by weight to 10 parts by weight with respect to one part by weight of said diazonium material.

7. A diazo-type thermosensitive recording material as claimed in claim 1, wherein said water-insoluble binder agent is selected from the group consisting of organic-solvent-soluble resins and water-dispersible resins.

8. A diazo-type thermosensitive recording material as claimed in claim 1, further comprising at least one additional layer selected from the group consisting of an undercoat layer formed on said support material, an overcoat layer formed on the top layer of said diazo-type thermosensitive recording material and an intermediate layer formed between said diazonium compound layer and said coupler layer.

9. A diazo-type thermosensitive recording material as claimed in claim 1, wherein said diazonium compound is selected from the group consisting of the diazonium compounds of the formulae:

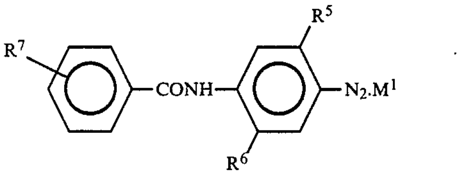

(I)

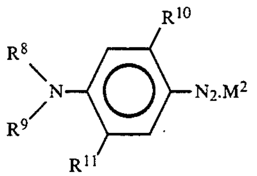

(II)

-continued

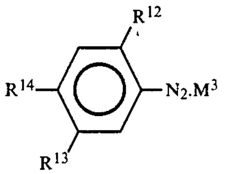

(III)

wherein $R^5$, $R^{10}$ and $R^{12}$ each represent hydrogen, a halogen, an alkyl group or alkoxy group having one to five carbon atoms,

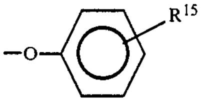

or

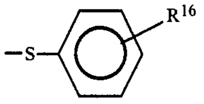

where $R^{15}$ and $R^{16}$ are the same as $R^6$;

$R^6$, $R^7$ and $R^{13}$ each represent hydrogen, a halogen or an alkyl or alkoxy group having one to five carbon atoms;

$R^8$ and $R^9$ each represent an identical or different alkyl group or hydroxyalkyl group with one to five carbon atoms or

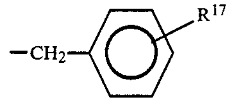

where $R^{17}$ is hydrogen, an alkyl or alkoxy group having one to three carbon atoms or a halogen;

$R^{11}$ represents hydrogen, a halogen, a trifluoromethyl group, an alkyl or alkoxy group having one to five carbon atoms or

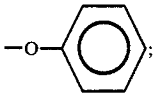

;

$R^{14}$ represents

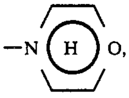

,

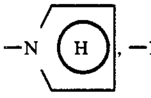

,

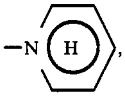

,

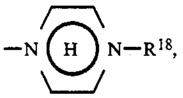

,

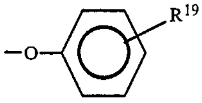

or

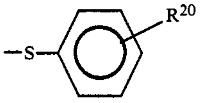

where $R^{18}$, $R^{19}$ and $R^{20}$ are the same as $R^{17}$; and $M^1$, $M^2$ and $M^3$ each represent an acidic residue or an acidic residue in the form of a double salt in combination with a metallic salt.

10. A diazo-type thermosensitive recording material as claimed in claim 1, wherein said coupler is selected from the group consisting of phenol, phenol derivatives, naphthol, naphthol derivatives, and active methylene compounds.

11. A diazo-type thermosensitive recording material as claimed in claim 1, wherein said thermosensitive coloring layer further comprises an acidic material capable of controlling the coupling reaction between said diazonium compound and said coupler so as to improve the preservability of said diazo-type thermosensitive recording material.

12. A diazo-type thermosensitive recording material as claimed in claim 1, wherein said thermosensitive coloring layer further comprises a filler capable of improving the compatibility of said thermosensitive coloring layer with a thermal head which applies heat to said thermosensitive coloring layer for image formation.

13. A diazo-type thermosensitive recording material as claimed in claim 1, in which said thermo-fusible material is selected from the group consisting of 2-tribromoethanol, 2,2-dimethyl-trimethylene glycol, cyclohexane-1,2-diol, malonic acid, glutaric acid, maleic acid, methylmaleic acid, bees wax, shellac wax, carnauba wax, montan wax, paraffin wax, microcrystalline wax, polyalcohol esters of higher fatty acids, higher fatty amines, higher fatty amides, condensates of fatty acids and amines, condensates of aromatic acids and amines, synthetic paraffins, paraffin chlorides, metal salts of high fatty acids, higher straight-chain glycols and dialkyl-3,4-epoxyhexahydrophthalate.

14. A diazo-type thermosensitive recording material comprising a support, a thermosensitive coloring layer formed on said support, said thermosensitive coloring layer comprising a diazonium compound layer containing a diazonium compound and a coupler layer containing a coupler, and, of said diazonium compound layer and said coupler layer, at least the layer thereof that is closer to said support also contains a thermo-fusible material and a water-insoluble binder agent, said thermo-fusible material being effective to obtain high speed coloring of said recording material when a thermal printing head is applied thereto, the amount of said thermo-fusible material being in the range of from 2 to 30 parts by weight per one part by weight of said diazonium compound, and a portion of said thermosensitive recording material, other than said diazonium compound layer, contains an imidazole derivative selected from the group consisting of 2-undecylimidazole, 2-heptadecylimidazole, 2-undecyl-4-methylimidazole, 1-cyanoethyl-2-undecylimidazole, 1-cyanoethyl-2-heptadecyl-4-methylimidazole and 1-benzyl-2-heptadecyl-4-methyl-imidazole.

* * * * *